United States Patent
Horng et al.

(10) Patent No.: US 7,170,242 B1
(45) Date of Patent: Jan. 30, 2007

(54) PULSE-WIDTH-MODULATION MOTOR DRIVE CIRCUIT

(75) Inventors: Alex Horng, Kaohsiung (TW); Chung-Ken Cheng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/274,417

(22) Filed: Nov. 16, 2005

(51) Int. Cl.
*H02P 6/08* (2006.01)
*G05F 1/652* (2006.01)

(52) U.S. Cl. .................. 318/254; 318/439; 318/432; 318/817

(58) Field of Classification Search ............... None
See application file for complete search history.

(56) References Cited

U.S. PATENT DOCUMENTS

| | | | |
|---|---|---|---|
| 5,099,181 A * | 3/1992 | Canon | 318/254 |
| 5,744,921 A | 4/1998 | Makaran | |
| 5,901,268 A * | 5/1999 | Ando et al. | 388/811 |
| 6,040,668 A * | 3/2000 | Huynh et al. | 318/471 |
| 6,285,146 B1 * | 9/2001 | Harlan | 318/254 |
| 6,392,372 B1 | 5/2002 | Mays, II | |
| 6,545,442 B2 * | 4/2003 | Sunaga et al. | 318/727 |
| 6,725,132 B2 | 4/2004 | Frankel et al. | |
| 6,815,916 B2 * | 11/2004 | Horng et al. | 318/138 |
| 2003/0198464 A1 * | 10/2003 | Horng et al. | 388/831 |
| 2004/0164692 A1 * | 8/2004 | Xi | 318/268 |
| 2006/0056823 A1 * | 3/2006 | Wu et al. | 388/831 |
| 2006/0076912 A1 * | 4/2006 | Yang et al. | 318/254 |

* cited by examiner

*Primary Examiner*—Lincoln Donovan
*Assistant Examiner*—Eduardo Colon Santana
(74) *Attorney, Agent, or Firm*—Bacon & Thomas, Pllc

(57) ABSTRACT

A PWM motor drive circuit includes a drive IC member, a Hall IC member, a PWM converter circuit and a capacitor. The drive IC member electrically connects with the Hall IC member, the drive IC member further includes a pin electrically connected with the PWM converter circuit. The capacitor connects in parallel between the pin of the drive IC member and the PWM converter circuit, and further connects with a power source to supply a voltage to the pin of the drive IC member. When the motor is started, the capacitor can prevent occurring zero volts at the pin of the drive IC member so that the drive IC member cannot unexpectedly enter a high-speed mode.

10 Claims, 4 Drawing Sheets

PULSE-WIDTH-MODULATION MOTOR DRIVE CIRCUIT

BACKGROUND OF THE INVENTION

1. Field of the Invention

The present invention relates to a PWM (Pulse Width Modulation) motor drive circuit. More particularly, the present invention relates to the PWN modulation motor drive circuit having a capacitor parallel-connected between a drive IC member and a PWM converter circuit so as to prevent the motor from entering a high-speed mode while starting.

2. Description of the Related Art

Referring to FIG. 1, a conventional PWM motor includes a PWM motor drive circuit 1 electrically connected with a motor coil 2 so as to carry out alternatively magnetizing the motor coil 2. The alternatively magnetized motor coil 2 can drive a motor rotor (not shown) to turn with respect to a motor stator of the motor. Typically, the PWM motor drive circuit 1 includes a drive IC member 10, a Hall IC member 11 and a PWM converter circuit 12. The drive IC member 10 electrically connects with the Hall IC member 11 so as to permit drive IC member 10 to receive rotor-detecting signals generated from the Hall IC member 11. However, the drive IC member 10 is designed to have a pin $V_{TH}$ which electrically connects with the PWM converter circuit 12. Correspondingly, the PWM converter circuit 12 has a PWM input pin 121 serving to introduce a PWM signal from an exterior system (not shown). The PWM signal is converted into a voltage signal by the PWM converter circuit 12, and then sent it to the pin $V_{TH}$ of the drive IC member 10 for controlling or adjusting a period of alternative magnetization of the motor coil 2. Accordingly, operational statuses of the motor are possessed of multi-speed modes in heat-dissipating operation by means of the PWM signal.

Generally, the motor divides the operational statuses into a high-speed mode (including full speed), a low-speed mode (excluding full or zero speed) and a stopping mode (zero speed). The drive IC member 10 can determine the operational statuses of the motor according to the input PWM signal such that the motor can be adjusted and changed in speeds to fulfill various system needs. For example, when a voltage of the pin $V_{TH}$ of the drive IC member 10 is higher than 3.6 V, the drive IC member 10 controls the motor to operate at the stopping mode as well as zero rpm. Conversely, when the voltage of the pin $V_{TH}$ of the drive IC member 10 is lower than 2.0 V, the drive IC member 10 controls the motor to operate at the high-speed mode as well as 6,000 rpm. If the voltage of the pin $V_{TH}$ of the drive IC member 10 is in the range of 2.0 V to 3.6 V, the drive IC member 10 controls the motor to operate at the low-speed mode as well as greater than zero rpm but lesser than 6,000 rpm.

Referring again to FIG. 1, the PWM motor drive circuit 1 is designed to have a capacitor 3 parallel-connected between the drive IC member 10 and the PWM converter circuit 12. Meanwhile, the capacitor 3 is designed to have a ground connection in place. In operation, the capacitor 3 is adapted to commutate a saw tooth wave input from the PWM converter circuit 12. However, the capacitor 3 of the PWM motor drive circuit 1 is so configured to stabilize the voltage of the pin $V_{TH}$ of the drive IC member 10. When the motor is actuated, the voltage of the pin $V_{TH}$ of the drive IC member 10 can determine and adjust the speed of the motor.

Referring to FIGS. 2A and 2B, the drive IC member 10 can control the motor to operate in the high-speed mode or the low-speed mode. In normal operation, the speed of the motor is operating at 2,000 rpm as well as low-speed mode when the voltage of the pin $V_{TH}$ of the drive IC member 10 is maintained at 3.0 V (i.e. lesser than 3.6 V but greater than 2.0 V). But, in abnormal operation, the speed of the motor is operating at high-speed mode when the voltage of the pin $V_{TH}$ of the drive IC member 10 is dropped to zero volts (i.e. lesser than 2.0 V).

Still referring to FIGS. 2A and 2B, due to a ground connection, the voltage across the capacitor 3 is generally zero volts, as best shown in FIG. 2A, and the capacitor 3 can be charged by a voltage from a power supply when the motor is started. Inevitably, the voltage of the pin $V_{TH}$ of the drive IC member 10 is maintained at substantially zero volts. In this way, the drive IC member 10 can invariably control the motor to operate in the high-speed mode as long as the motor is started; namely, the speed of the motor is rapidly and shortly jumped to 6,000 rpm (i.e. full speed) from zero rpm, as best shown in FIG. 2B.

Referring back to FIGS. 1 and 2B, once started, the motor must inevitably enter the high-speed mode that must rapidly and shortly increase the speed of the motor. However, there is no greater amount of operational heat for dissipation. This results in the motor unnecessarily operating at full speed (i.e. top speed) that generates an increased amount of air noise and vibration. Furthermore, the motor occurs an increased amount of abrasion among motor components that may shorten the longevity of the motor.

Referring again to FIGS. 2A and 2B, the voltage across the capacitor 3 can reach 3 V in the event after charging for a predetermined time. In this way, the voltage of the pin $V_{TH}$ of the drive IC member 10 is greater than 2.0 V but lesser than 3.6 V so that the drive IC member 10 terminates the motor to operate in the high-speed mode. Accordingly, the speed of the motor is dropped to a predetermined speed or a lower speed of 2,000 rpm.

However, ambient heat generated from a heat source is lower than a high temperature when the motor is started. Therefore, it is undesirable to permit the drive IC member 10 to increase the speed of the motor reaching 6,000 rpm in the high-speed mode that is unsuitable for the need of normal usage or an improper usage of the motor due to a waste of power consumption. Hence, there is a need for improving the motor to prevent entering the high-speed mode while starting.

The present invention intends to provide a PWM motor drive circuit having a capacitor parallel-connected between a drive IC member and a PWM converter circuit. The capacitor further electrically connects with a power source so that a voltage of a pin $V_{TH}$ of the drive IC member cannot be started at zero volts while starting the motor. Accordingly, the voltage applied to the pin $V_{TH}$ of the drive IC member can prevent the motor from entering a high-speed mode while starting the motor in such a way as to mitigate and overcome the above problem.

SUMMARY OF THE INVENTION

The primary objective of this invention is to provide a PWM motor drive circuit having a capacitor parallel-connected between a drive IC member and a PWM converter circuit. The capacitor further electrically connects with a power source to supply a voltage to a pin $V_{TH}$ of the drive IC member which cannot be started at zero volts while starting the motor. Accordingly, the PWM motor drive circuit is so configured to avoid rapidly increasing a speed of the motor while starting the motor, and to avoid generating vibration and air noise.

The secondary objective of this invention is to provide the PWM motor drive circuit having a capacitor parallel-connected between a drive IC member and a PWM converter circuit. The capacitor further electrically connects with a power source to supply a voltage to a pin $V_{TH}$ of the drive IC member which cannot unexpectedly enter a high-speed mode while starting the motor. Accordingly, the PWM motor drive circuit is so configured to avoid the motor to unexpectedly enter a high-speed mode while starting.

The PWM motor drive circuit of the PWM motor in accordance with an aspect of the present invention includes a drive IC member, a Hall IC member, a PWM converter circuit and a capacitor. The drive IC member electrically connects with the Hall IC member, the drive IC member further includes a pin electrically connected with the PWM converter circuit. The capacitor connects in parallel between the pin of the drive IC member and the PWM converter circuit, and further connects with a power source to supply a voltage to the pin of the drive IC member. When the motor is started, the capacitor can prevent occurring zero volts at the pin of the drive IC member so that the drive IC member cannot unexpectedly enter a high-speed mode.

In a separate aspect of the present invention, the capacitor can be constructed from a plurality of capacitor units which are connected in parallel each other.

In a further separate aspect of the present invention, the capacitor can be constructed from a plurality of capacitor units which are connected in series each other.

In a yet further separate aspect of the present invention, a capacitance of the capacitor can be adjusted according to the design choice so that a buffer period for the PWM motor drive circuit can be adjusted.

In a yet further separate aspect of the present invention, the drive IC member has a first pin and a second pin; the capacitor connects between the first pin and the second pin of the drive IC member.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
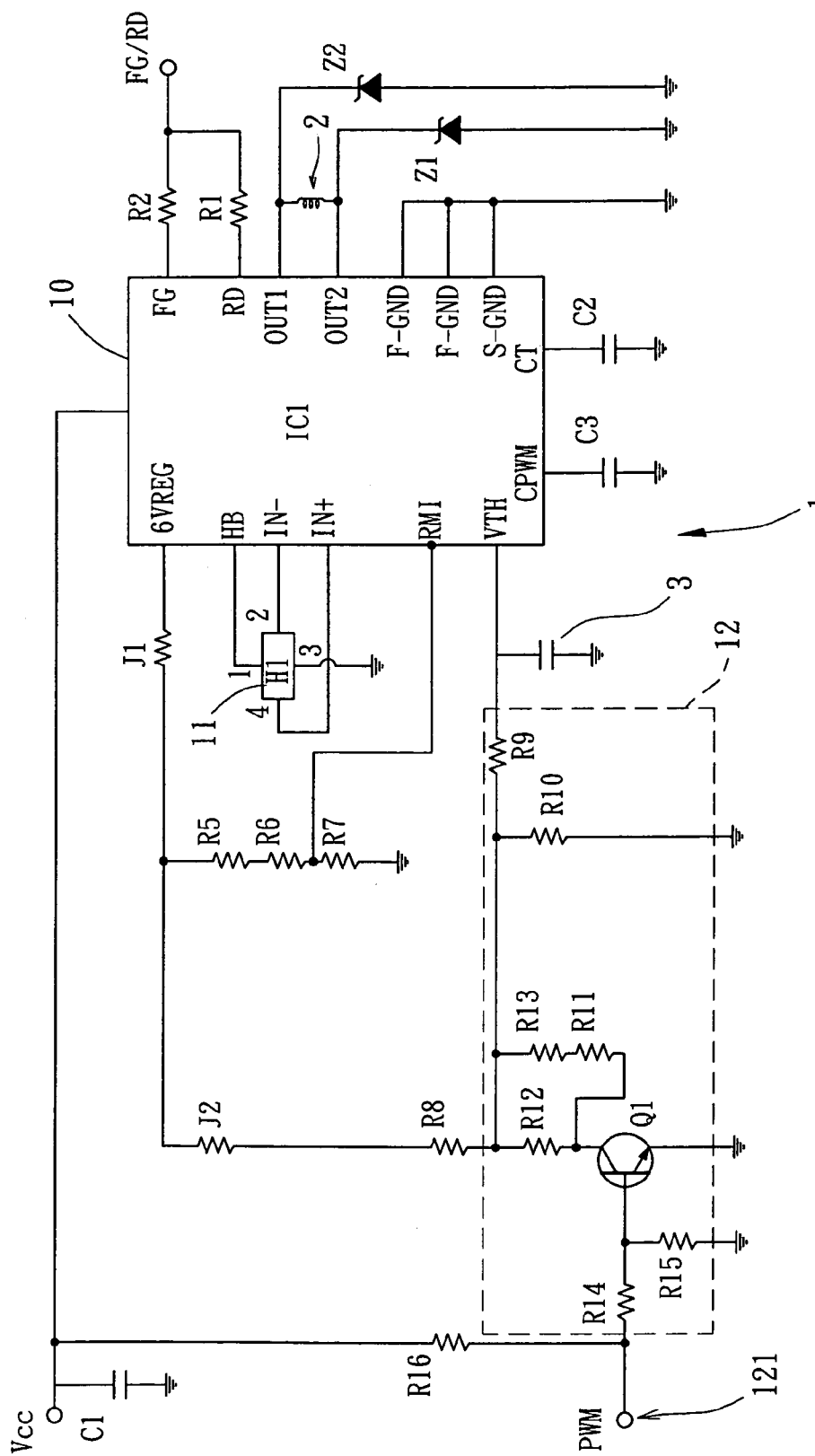
FIG. 1 is a schematic circuitry diagram of a conventional PWM motor drive circuit in accordance with the prior art.
Figure 3:
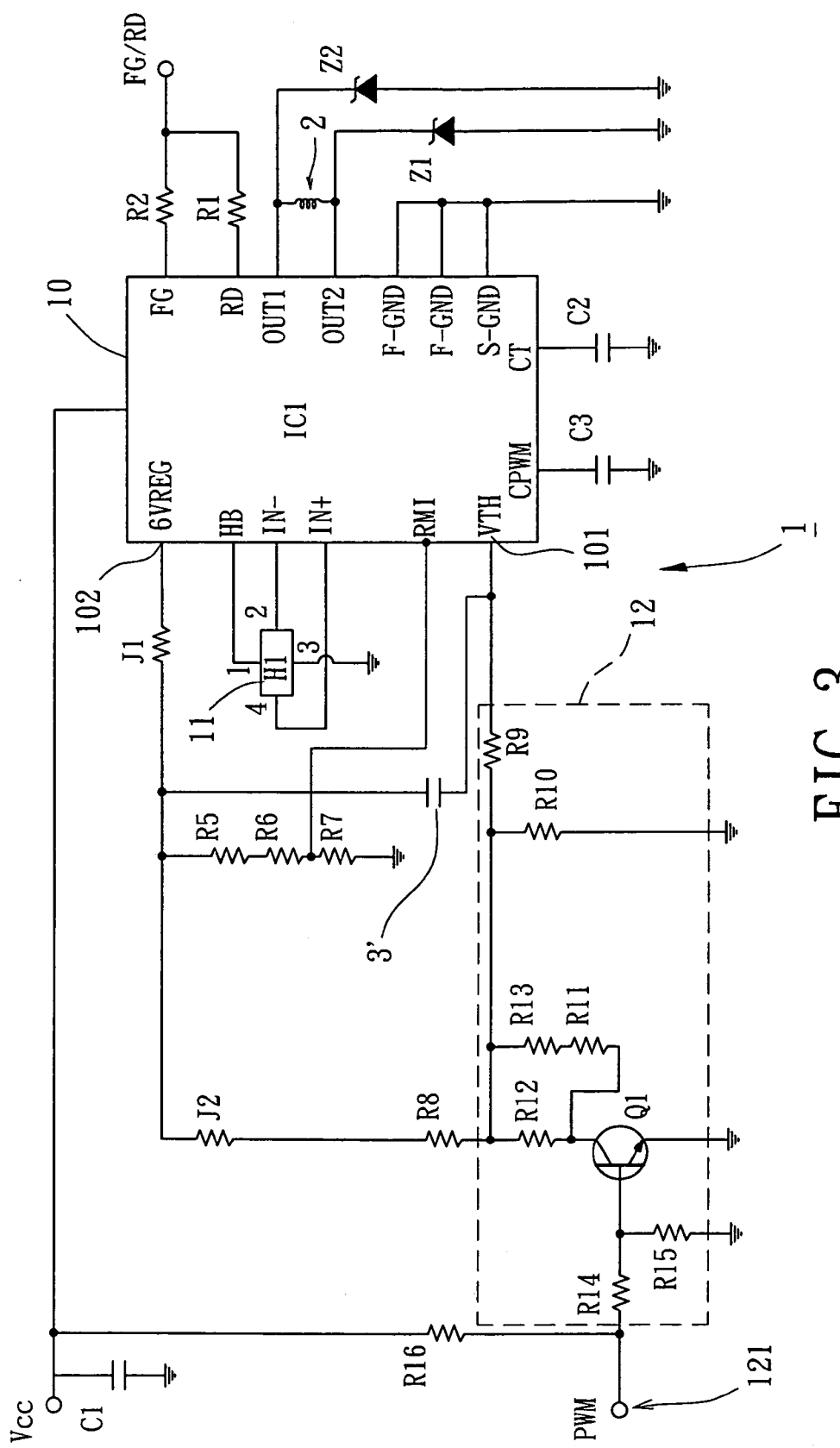
FIG. 3 is a schematic circuitry diagram of a PWM motor drive circuit in accordance with a preferred embodiment of the present invention.

Turning now to FIG. 3, a schematic circuitry diagram illustrating a PWM motor drive circuit in accordance with a preferred embodiment of the present invention is provided. It should be understood that reference numerals of the PWM motor drive circuit of the preferred embodiment of the present invention have applied the identical numerals of the conventional PWM motor drive circuit, as shown in FIG. 1.

Still referring to FIG. 3, a PWM motor drive circuit 1 electrically connects with a motor coil 2 so as to carry out alternatively magnetizing the motor coil 2. In a preferred embodiment, the motor coil 2 can be selected from a group consisting of a single-phase coil, a double-phase coil and a three-phase coil. Typically, the PWM motor drive circuit 1 includes a drive IC member 10, a Hall IC member 11, a PWM converter circuit 12 and at least one capacitor 3'. In operation, the PWM motor drive circuit 1 is adapted to control the motor coil 2 so that the motor coil 2 can generate an alternatively magnetic field.

Still referring to FIG. 3, the drive IC member 10 electrically connects with the Hall IC member 11, and further electrically connects with the PWM converter circuit 12. The drive IC member 10 includes a first pin (identified as $V_{TH}$) 101 and a second pin 102 (identified as 6VREG). The first pin $V_{TH}$ 101 is adapted to electrically connect with the PWM converter circuit 12 for introducing PWM signals while the second pin 102 is adapted to supply a predetermined voltage to the PWM converter circuit 12 and the capacitor 3'. In a preferred embodiment, the second pin 102 of the drive IC member 10 supplies 6.0 V to the PWM converter circuit 12 and the capacitor 3'.

Figure 4A:
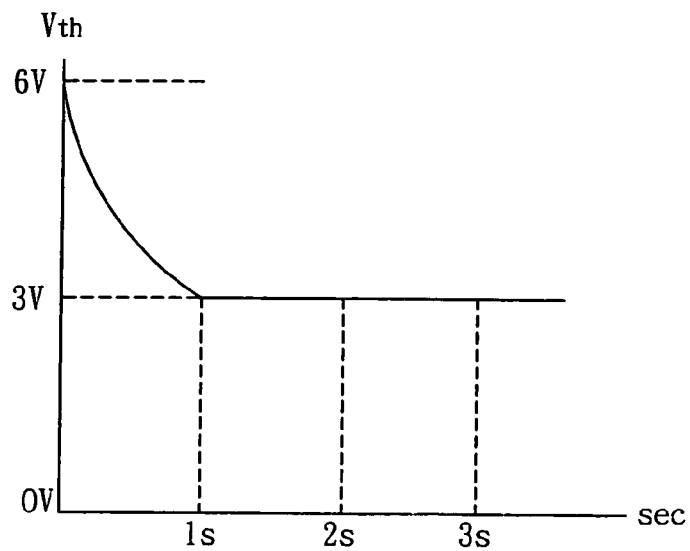
FIG. 4A is a timing diagram relating to the voltage at a selected pin of a drive IC member of the PWM motor drive circuit in FIG. 3 in accordance with the preferred embodiment of the present invention.
Figure 4B:
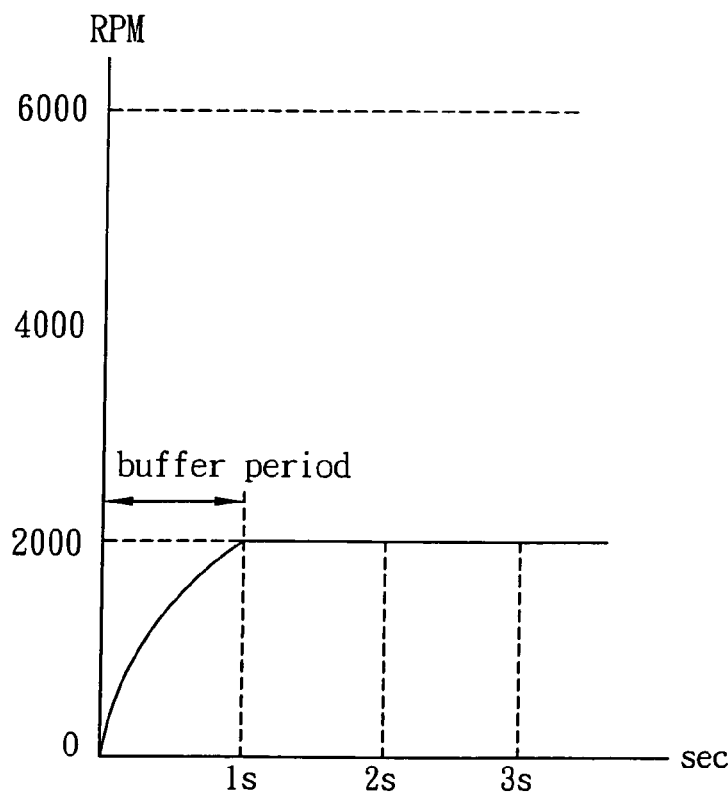
FIG. 4B is a timing diagram relating to the speed of the PWM motor in accordance with the preferred embodiment of the present invention.

Turning now to FIGS. 4A and 4B, a timing diagram relating to the voltage at the first pin $V_{TH}$ 101 of the drive IC member of the PWM motor drive circuit in FIG. 3, and a timing diagram relating to the speed of the PWM motor in accordance with the preferred embodiment of the present invention are illustrated.

Referring again to FIGS. 3, 4A and 4B, when the PWM motor is started, the first pin 101 of the drive IC member 10 connects with the second pin 102 via the capacitor 3' so to as to build a predetermined voltage at the first pin 101 of the drive IC member 10, 6.0 V for example. The drive IC member 10 can control the speed of the PWM motor according to the need. In normal operation, when the voltage of the first pin 101 of the drive IC member 10 is maintained at 3.0 V (i.e. less than 3.6 V but greater than 2.0 V), the speed of the PWM motor can be operated at 2,000 rpm as well as in a low-speed mode. But, conversely, when the voltage of the first pin 101 of the drive IC member 10 is dropped to zero volts (i.e. less than 2.0 V), the speed of the PWM motor can be operated in a high-speed mode, as best shown in FIGS. 4A and 4B.

Still referring to FIGS. 4A and 4B, once the PWM motor is started, the first pin 101 of the drive IC member 10 can be built the voltage of 6.0 V; subsequently, the voltage of the first pin 101 of the drive IC member 10 can be gradually dropped to 3.0 V, as shown in FIG. 4A. Correspondingly, the speed of the PWM motor can be gradually increased from zero to 2,000 rpm or a predetermined speed, as shown in FIG. 4B. Consequently, the drive IC member 10 can control the PWM motor to have a buffer period for increasing speed so as to smoothly speed the PWM motor to the predetermined speed and to maintain the speed of the PWM motor in the low-speed mode.

Referring back to FIG. 3, the Hall IC member 11 is adapted to detect a signal of a motor rotor and to send it to the drive IC member 10. Accordingly, the drive IC member 10 can determine switching on or off the motor coil 2 such that the alternatively magnetic field of the motor coil 2 can drive the motor rotor to turn.

Still referring to FIG. 3, the PWM converter circuit 12 has a PWM input terminal 121 connected with a PWM source so as to receive PWM signals. In operation, the PWM converter circuit 12 is adapted to convert the PWM signals into voltage signals and to send them to the first pin 101 of the drive IC member 10 such that the drive IC member 10 can determine a cycle for switching the alternatively magnetic field of the motor coil 2. Consequently, the speed of the PWM motor is controlled.

Still referring to FIG. 3, the capacitor 3' connects in parallel between the first pin 101 of the drive IC member 10 and the PWM converter circuit 12. In an alternative embodiment, the capacitor 3' can be constructed from a plurality of capacitor units which are connected in parallel or series each other. Meanwhile, the capacitor 3' connects between the first pin 101 and the second pin 102 of the drive IC member 10. In an alternative embodiment, the capacitor 3' can connect with a power source. When the PWM motor is stopped, the voltage of the capacitor 3' can be maintained at 3.0 V due to the voltage of the second pin 102 of the drive IC member 10.

Referring again to FIGS. 4A and 4B, once the PWM motor is started, the voltage of the first pin 101 of the drive IC member 10 can be gradually dropped from 6.0 V to 3.0 V. Correspondingly, the speed of the PWM motor can be started from zero (i.e. stopped status); speeded up within the buffer period determined by the PWM motor drive circuit 1; and maintained at 2,000 rpm or a predetermined speed in the event.

Referring back to FIG. 3, the capacitance of the capacitor 3' can be adjusted according to the design choice so that the buffer period for the PWM motor drive circuit 1 can be adjusted. Advantageously, the speed of the PWM motor must be paced within the buffer period determined by the PWM motor drive circuit 1 to reach a predetermined speed. Consequently, improper speeding of the PWM motor can be eliminated while starting.

Figure 2A:
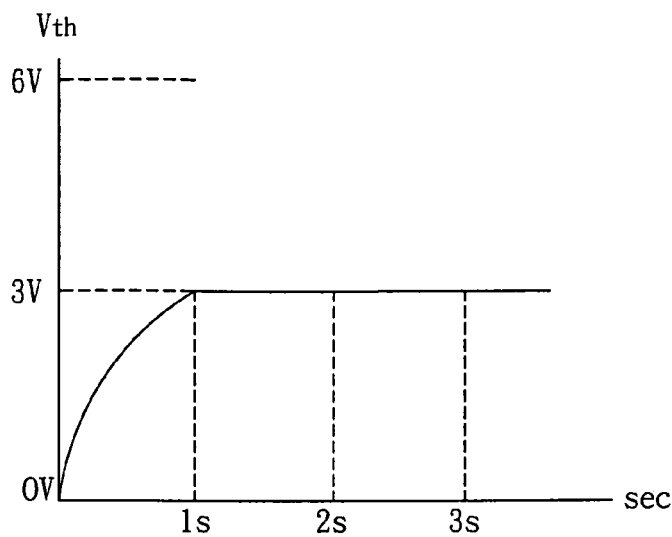
FIG. 2A is a timing diagram relating to the voltage at a selected pin of a drive IC member of the conventional PWM motor drive circuit in FIG. 1 in accordance with the prior art.
Figure 2B:
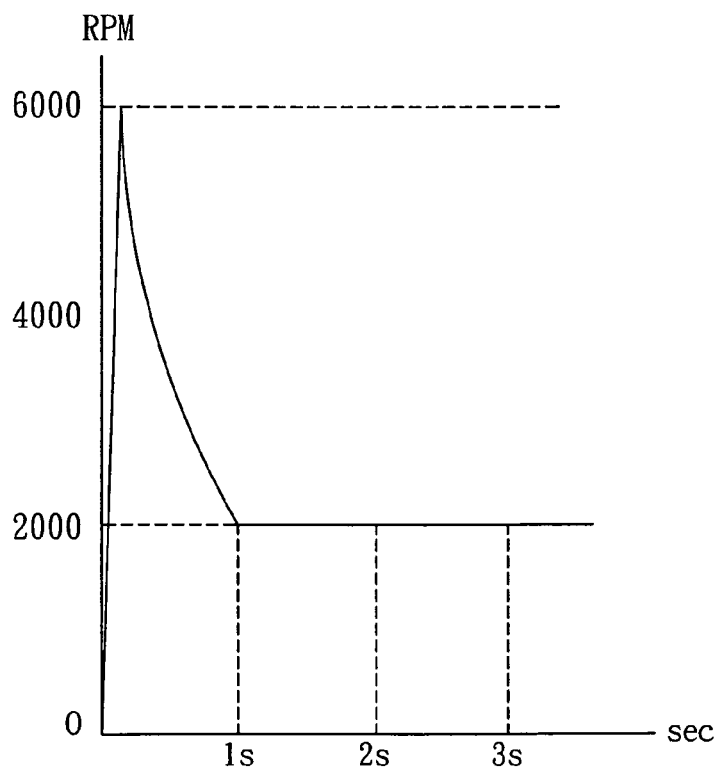
FIG. 2B is a timing diagram relating to the speed of the conventional PWM motor in accordance with the prior art.

As has been discussed above, referring back to FIG. 1, the conventional PWM motor drive circuit 1 includes the capacitor 3 connected in parallel between the drive IC member 10 and the PWM converter circuit 12, and the capacitor 3 is further designed to have the ground connection. Disadvantageously, when the conventional PWM motor is started, the voltage of the capacitor 3 is zero such that the PWM motor is operated in the high-speed mode, and rapidly jumped to the speed of 6,000 rpm, as shown in FIG. 2B. Conversely, the PWM motor drive circuit 1 in accordance with the present invention includes the capacitor 3' connected in parallel between the drive IC member 10 and the PWM converter circuit 12 and no ground connection. Instead, the capacitor 3' is further connected between the first pin 101 and the second pin 102 of the drive IC member 10. Advantageously, when the PWM motor is started, the voltage of the capacitor 3' is built up at 6.0 V such that the PWM motor can be operated in the low-speed mode, and gradually increased to the speed of 2,000 rpm or the predetermined speed, as shown in FIG. 4B.

It is found that the drive IC member 10 in accordance with the present invention can control the PWM motor to speed up within the buffer period. When the PWM motor is started, ambient heat generated from a heat source is relatively lower than a high temperature that permits the drive IC member 10 to gradually speed up the PWM motor to 2,000 rpm or a predetermined speed. Advantageously, the PWM motor can be operated according to the need; undesired power consumption of the PWM motor can be alleviated; and air noise of the PWM motor can be eliminated while starting.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A PWM motor drive circuit, comprising:
   a drive IC member electrically connected with a motor coil, the drive IC member controlling a speed of a motor by means of a PWM signal;
   a PWM converter circuit electrically connected with the drive IC member for inputting the PWM signal; and
   at least one capacitor connected in parallel between the drive IC member and the PWM converter circuit, said capacitor further connected with a power source and having no ground connection,
   wherein when the motor is started, said capacitor accumulates a predetermined voltage to prevent the drive IC member from entering a high-speed mode; said capacitor controlling the drive member to gradually speed up the speed of the motor from zero to a predetermined speed.

2. The PWM motor drive circuit as defined in claim 1, wherein the drive IC member has a first pin and a second pin; and said capacitor connects between the first pin and the second pin of the drive IC member.

3. The PWM motor drive circuit as defined in claim 1, wherein said capacitor is constructed from a plurality of capacitor units which are connected in parallel or series with each other.

4. The PWM motor drive circuit as defined in claim 1, wherein the drive IC member has a buffer period for speeding up the speed of the motor such that the speed of the motor is gradually speeded up within the buffer period to reach the predetermined speed.

5. The PWM motor drive circuit as defined in claim 4, wherein a capacitance of said capacitor is adjusted that the buffer period of the PWM motor device circuit is adjusted.

6. A PWM motor, comprising:
   a motor coil adapted to generate a magnetic field for driving a motor rotor;
   a PWM motor drive circuit including a drive IC circuit electrically connected to the motor coil, the PWM motor drive circuit controlling a speed of the motor by means of a PWM signal;
   a PWM converter circuit electrically connected with the drive IC member for inputting the PWM signal; and
   at least one capacitor connected in parallel between the drive IC member and the PWM converter circuit, said capacitor further connected with a power source and having no ground connection;
   wherein when the motor is started, said capacitor accumulates a predetermined voltage to prevent the drive IC member from entering a high-speed mode; said capacitor controlling the drive IC member to gradually speed up the speed of the motor from zero to a predetermined speed.

7. The PWM motor as defined in claim 6, wherein the drive IC member has a first pin and a second pin; and said capacitor connects between the first pin and the second pin of the drive IC member.

8. The PWM motor as defined in claim 6, wherein said capacitor is constructed from a plurality of capacitor units which are connected in parallel or series with each other.

9. The PWM motor as defined in claim 6, wherein the drive IC member has a buffer period for speeding up the speed of the motor such that the speed of the motor is gradually speeded up within the buffer period to reach the predetermined speed.

10. The PWM motor as defined in claim 9, wherein a capacitance of said capacitor is adjusted according to so that the buffer period of the PWM motor drive circuit is adjusted.

* * * * *